US012764034B1

(12) United States Patent
Rao et al.

(10) Patent No.: US 12,764,034 B1
(45) Date of Patent: Oct. 13, 2026

(54) SECURE MULTI-MODEL HOSTING AND EXPERIMENTATION IN A CLOUD PROVIDER NETWORK

(71) Applicant: Amazon Technologies, Inc., Seattle, WA (US)

(72) Inventors: Karthik Ravindra Rao, San Jose, CA (US); Sai Srinivas Somarouthu, Sunnyvale, CA (US); Kenneth John Sanchez Venegas, Bellevue, WA (US); Vladimir Mitrovic, Kent, WA (US); Himani Amrish Shah, Seattle, WA (US); Matthew Lee, Elmhurst, NY (US); Rama Krishna Sandeep Pokkunuri, Redmond, WA (US); Vamshidhar Dantu Krishnamurthy, San Jose, CA (US); Alice Aizawa, Seattle, WA (US); Srinivas Iragavarapu, Redmond, WA (US); Qiang Yu, Kirkland, WA (US); Sathish Arumugam Selvaraj, Snohomish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/797,155

(22) Filed: Aug. 7, 2024

(51) Int. Cl.
*H04L 41/16* (2022.01)
*H04L 41/14* (2022.01)
*H04L 67/10* (2022.01)

(52) U.S. Cl.
CPC .............. *H04L 41/16* (2013.01); *H04L 41/14* (2013.01); *H04L 67/10* (2013.01)

(58) Field of Classification Search
None
See application file for complete search history.

(56) References Cited

U.S. PATENT DOCUMENTS 11,113,046 B1 * 9/2021 Bowen .................... G06F 9/485
2025/0156898 A1 * 5/2025 Crabtree ............ G06Q 30/0277

* cited by examiner

*Primary Examiner* — June Sison
(74) *Attorney, Agent, or Firm* — Nichols DeVos Webster & Elliott LLP

(57) ABSTRACT

Techniques for secure multi-model hosting and experimentation in a cloud provider network are described. A request to perform an action involving one of multiple machine learning (ML) models is received at a cloud provider network. A user associated with the request can be consistently mapped to a particular experience from multiple experiences of an experiment. Based on this experience, a request to use a ML model can be sent by a data plane component that includes a path value associated with the experience. The request can be sent from the data plane component to a private connectivity endpoint, which securely provides the request into another virtual private cloud including the ML models without the request transiting the public internet. The request can be routed via path-based routing and the included path value to a ML model providing the experience.

20 Claims, 9 Drawing Sheets

SECURE MULTI-MODEL HOSTING AND EXPERIMENTATION IN A CLOUD PROVIDER NETWORK

BACKGROUND

Machine learning refers to a discipline by which computer systems can be trained to recognize patterns through repeated exposure to training data. The learned parameters of the model can be considered as an encoding of meaningful patterns in the training data, such that the trained model can then recognize these same patterns in new data. The use of a trained model in production is often referred to as "inference," during which the model receives new data that was not in its training data set and provides an output based on its learned parameters. In contrast to machine learning (ML), artificial intelligence (AI) refers to a human perception of a computer system as possessing a capability typically considered to require intelligence. Generative AI, or "GenAI", refers to a class of ML models that are able to produce net new content as their outputs, for example text, images, and video.

BRIEF DESCRIPTION OF DRAWINGS

Various examples in accordance with the present disclosure will be described with reference to the drawings, in which.

DETAILED DESCRIPTION

Figure 1:
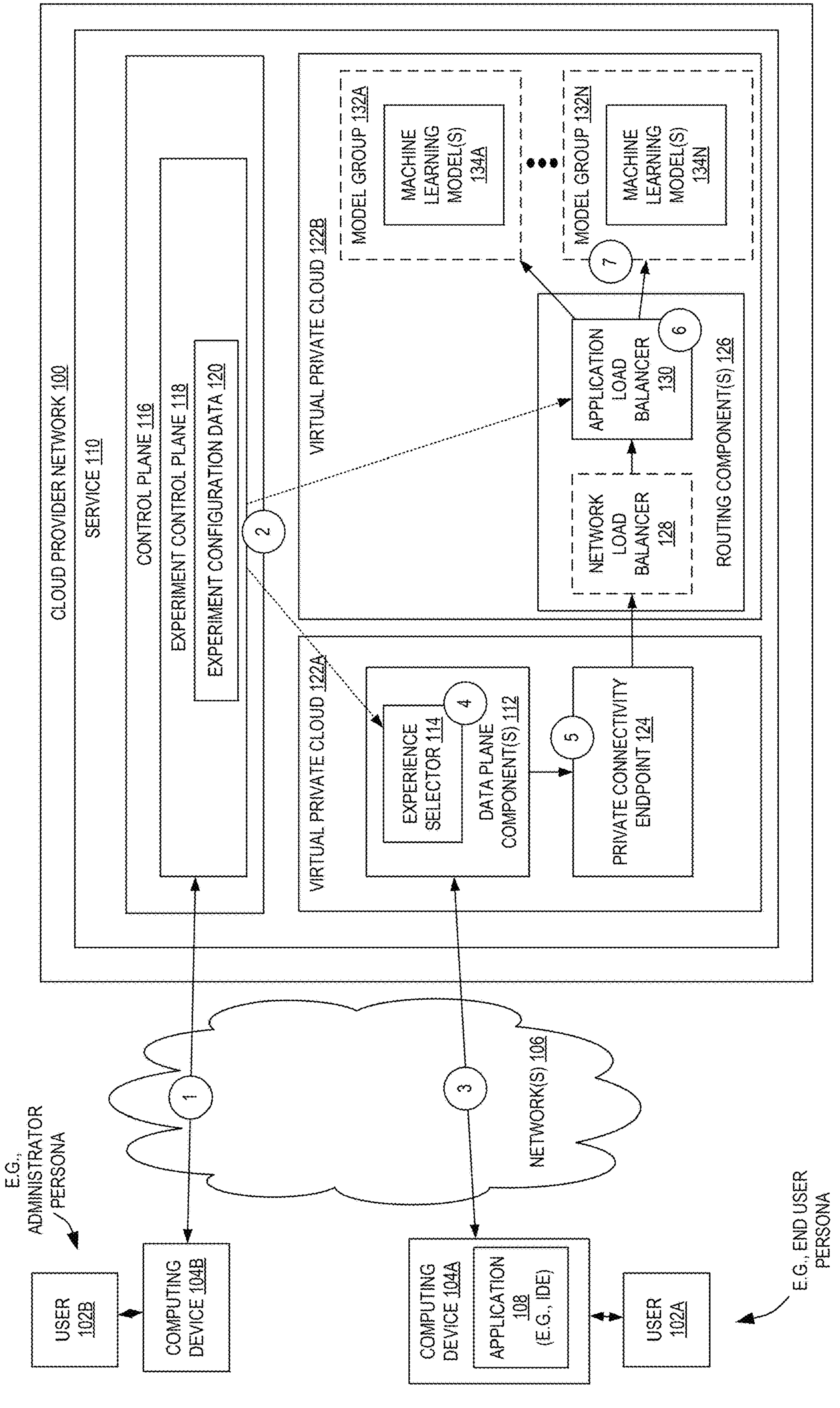
FIG. 1 is a diagram illustrating an environment for secure multi-model hosting and experimentation in a cloud provider network according to some examples.

The software industry is constantly evolving, with new tools and technologies emerging that use generative artificial intelligence (AI) to power productivity enhancing software and services, such as for text summarization and querying, generation of draft text or graphical content, and to help developers write better code more efficiently. Existing solutions often rely on a single, global machine learning (ML)

model to provide these features, which can lead to performance and cost challenges as the model size and complexity grow. For example, larger models may need to run on the largest graphics processing units (GPUs) or custom ML inference chips, and larger models typically take longer to respond than smaller models.

These challenges, among others, are addressed by the disclosed Multi-Model Hosting (MMH) architecture, which enables the hosting of multiple machine learning models behind a single endpoint with intelligent path-based routing to specific models. The MMH architecture is designed to be highly scalable and extensible, allowing the system to easily support growth in use, new use cases, and increasing model and instance size requirements. It also enables modularization, where changes to one model do not affect the functionality of another, enabling A/B testing between different models or model versions. Additionally, the MMH architecture allows for greater system efficiency by hosting different models on compute instances of appropriate sizes, ensuring efficient resource utilization. By using a single endpoint with path-based routing, the system is more extensible than having a separate endpoint for each model, simplifying the overall architecture and reducing maintenance overhead. This enables a seamless customer experience engaging with a single service frontend, with backend functionality to detect the type of request the customer is making and route it to the appropriate model to handle such request, for example a smaller model that is designed to excel in a particular task set. Customers can simply call the service API and the service on the backend decides which model to use to handle their particular request. This also enables an innovative A/B testing framework tailored for generative AI models, enabling safe experimentation, controlled rollouts, and data-driven decision-making. This framework allows for splitting users into control and treatment groups, serving the new model or feature to only the treatment group initially. By monitoring and analyzing user interactions, telemetry data, and performance metrics across both groups, the system can evaluate the impact of the new feature in a real-world setting before fully rolling it out.

Accordingly, the present disclosure relates to methods, apparatus, systems, and non-transitory computer-readable storage media for secure multi-model hosting and experimentation in a cloud provider network. According to some examples, a service in a cloud provider network can securely and straightforwardly access and utilize machine learning (ML) models hosted in a separate portion of the network (e.g., in a separate virtual private cloud (VPC), also referred to as a cloud private network) using a cloud-internal direct communication channel together with a path-based routing approach in which requests are routed to a desired ML model (or group thereof) based on a specially-formed path component used in each request's resource identifier, such as a Uniform Resource Locator (URL). In some examples, the direct cloud-internal direct communication channel can utilize a private connectivity endpoint operating in a source VPC that can be easily reached by a data plane component of the service in that source VPC and that is capable of directly passing traffic to (and/or from) a separate "target" VPC where one or more resources (e.g., ML models) are hosted, without needing to pass this traffic via the public internet where it could be observed or intercepted. Moreover, in some examples the communication channel can also utilize a path-based routing approach, such as through an application load balancer, whereby a data plane component can send a request using a purposefully-selected path component enabling the application load balancer to determine where the request is ultimately to be sent, allowing the source of the traffic to beneficially remain unaware of the exact destination, the provider network to move or adjust the locations of these destination resources, etc.

In some examples, the system supports experimentation, such as A/B testing, in a simple but powerful manner through a deterministic mapping of user traffic to different experiences. In some examples, a user is deterministically mapped to a particular placeholder, referred to herein as a "bucket," which itself can be associated with one or more experiences of one or more experiments. Accordingly, embodiments can support multiple concurrent experiments each providing multiple experiences to be implemented for a set of users, such that the users are consistently provided the same experience. In various examples, these experiments can involve server-side (or "service-side") functionalities—such as the use of different ML models or "backend" logic—and/or client-side functionalities, such as the use of different features or functions on a user's computing device. Moreover, while multiple experiments and experiences can be provided via this system, beneficially each experiment can be adapted to not affect the operation of other experiments. Further, in some examples this technique can be implemented to provide multi-model (or multi-logic) support potentially without experimentation at all, in allowing a system easily consistently partition users (or groups thereof) across different cloud "backend" resources such as ML model instances.

In some examples, "rich" metrics are generated that provide experience-specific and/or experiment-specific information allowing ease of analysis regarding the results of the experimentation. By way of example, a service using techniques disclosed herein can provide multiple experiences for an experiment and easily generate metric data (e.g., indicative or related to the performance of these experiences) that can be directly labeled or associated with the involved experience or experiment. These metrics can straightforwardly be generated inline (of actual traffic/operations) and/or asynchronously generated (e.g., based on aggregated traffic/operations), and provide in-depth analytical content explicitly tied to the corresponding experiences and/or experiments, allowing sophisticated analysis and exploration of the results of the experimentation, such as through an analytics application.

Using various techniques and systems disclosed herein, users can simply create and manage a variety of computing experience experiments in a secure manner whereby the experimentation does not impact other experiments that may be concurrently in place for the service. Moreover, aspects disclosed herein provide straightforward and secure communications between data plane components (implementing the service) and more "backend" resources they utilize, such as ML models, that are located elsewhere in the cloud provider network, enabling secure multi-model hosting, A/B testing, and the like. Further, according to disclosed aspects, experimentation can be enabled that provides extremely beneficial and specific metric data regarding the involved experiences, enabling rapid analysis and understanding of the results of the experimentation.

FIG. 1 is a diagram illustrating an environment for secure multi-model hosting and experimentation in a cloud provider network 100 according to some examples. In FIG. 1, a service 110 is illustrated including a control plane 116 and one or more data plane components 112. The service 110 may be any of a variety of types of services offered via cloud provider networks, and comprise infrastructure, platforms, or software hosted by the cloud provider and made available to users, often via the internet. The service 110 can be implemented using software executed by hardware located in one or multiple locations, for example, often using a variety of physical computing devices in multiple locations, such as data centers in different geographic locations.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services (e.g., service 110), such as a hardware virtualization service that can execute compute instances, a storage service that can store data objects, etc. The users 102 (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Users 102 (via computing devices 104) can interact with a cloud provider network 100 across one or more intermediate networks 106 (e.g., the "public" internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 (or of a particular service 110, such as control plane 116) that includes "backend" services and resources supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM) or similar functionality, on a host allocates the host's hardware resources amongst various VMs on the host and monitors the execution of the VMs. Each VM can be provided one or more IP addresses in the overlay network, and the VMM for a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service 110 that a provider network may provide may be referred to as a "managed compute service" that executes code or provides computing resources for its users in a managed configuration. Examples of managed compute services include, for example, an on-demand code execution service, a hardware virtualization service, a container service, or the like.

However, many other types of services 110 exist. One example service 110 is a real-time artificial-intelligence (AI) coding companion (or "code assistant") service, such as Amazon CodeWhisperer or Amazon Q Developer. For example, a code assistant service may be a generative AI powered conversational assistant that can help users understand, build, extend, and operate cloud provider network applications, where users can ask questions about cloud provider network architecture, their cloud provider network resources, best practices, documentation, support, and more.

Thus, a code assistant service 110 may provide a variety of functionalities to its users (e.g., user 102A) through an application 108 such as a command line interface or an integrated development environment (IDE), a variety of which are known to those of skill in the art. These functionalities can be varied, and may include software development assistance functionalities such as code completion or suggestions, security issue and/or bug spotting and/or resolving, architectural changing, code refactoring or optimizing, code language transformation/porting (e.g., changing a block of code from a source language into a target language, such as from Python into Java), unit test creation, etc.

To provide these functionalities, such a code assistant service 110 may include a set of data plane components 112 that receive various requests (e.g., API calls) issued by applications 108 and act on those requests, which may include use of machine learning models and/or other backend functionalities, ultimately responding to the requests with a response. For example, the service 110 may support a "generate completions" type API call issued by an IDE to provide inline code suggestions. Through such requests, the IDE and service can provide code recommendations in (essentially) real time—as a user writes code, the IDE and service automatically generate suggestions based on the existing code and comments, which can vary in size and scope, ranging from a single line comment to fully formed functions. As another example, the service 110 may support a chat-type functionality where a user, via an IDE or other application, can have a text, audio, and/or video dialog with a chat-type agent implemented using or more ML models.

As part of servicing these requests, the data plane components 112 may utilize backend resources such as generative AI in the form of one or more ML models 134. The one or more ML models 134 may be different instances of a same model (e.g., a "scaled out" deployment of multiple instances of a same model, to support more concurrent requests) or different instances of different models, to support different functionalities (e.g., for different API calls) or even to support different models (or versions thereof) as part of experimentation (e.g., for A/B testing to evaluate the "real-world" utility or performance of different models and/or versions). These models 134 may be hosted in different model groups 132, where a model group is a collection or group of ML models that can be managed collectively and may include multiple models of a same type or of different types. A variety of types of ML models 134A-134N can be utilized by the implementor based on the particular type of functionality involved, for example, language models such as large language models (LLMs) used to understand and/or generate human language, convolutional neural networks (CNNs) often used for computer vision applications, recurrent neural networks (RNNs) often used for sequential data such time series analysis and natural language processing tasks, decision trees used for classification and/or regression tasks, random forests, support vector machines (SVMs), k-nearest neighbor (KNN) based models, autoencoders, etc. A language model is a type of AI model that is trained on textual data to generate coherent and contextually relevant text. A "large" language model refers to a language model that has been trained on an extensive dataset and has a high number of parameters, enabling them to capture complex language patterns and perform a wider range of tasks. Large language models are designed to handle a wide range of natural language processing tasks, such as text completion, translation, summarization, and even conversation. The specific parameter count required for a model to be considered a "large" language model can vary depending on context and technological advancements. However, large language models currently may have millions to billions of parameters.

The collection of ML models 134A-134M may be hosted separate from the data plane components 112 of the service 110. This can be done to increase security regarding these models, which may be resource intensive to run (and thus need to be protected from unauthorized traffic/accesses that may make them non-performant or inaccessible for legitimate uses), may be proprietary in nature (and thus are to be protected from disclosure to others), etc. Accordingly, in some examples, the ML models 134 are hosted in one or more virtual private clouds 122B that are separate from the one or more virtual private clouds 122B hosting the data plane components 112 of the service 110.

Generally, a virtual private cloud (VPC) (also referred to as a virtual network (VNet), virtual private network, or virtual cloud network, in various implementations) is a custom-defined, virtual network "within" another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the AZs in a particular region of the cloud provider. Thus, a VPC is a logically isolated virtual network that operates within the cloud provider network itself.

A VPC can provide the foundational network layer for a cloud service, for example a compute cloud or an edge cloud, or for a user application or workload that runs on the cloud. A VPC can be dedicated to a particular user account (or set of related user accounts, such as different user accounts belonging to the same business organization) or used "internally" by the cloud provider network to provide resources for its users and services. Users can launch resources, such as compute instances, into their VPC(s). When creating a VPC, a user can specify a range of IP addresses for the VPC in the form of a Classless Inter-Domain Routing (CIDR) block. After creating a VPC, a user can add one or more subnets in each availability zone or edge location associated with its region.

As described herein, the data plane components 112 seeking to utilize other resources such as ML models 134, can be adapted to interact with them via a secure communications channel allowing intercommunications therebetween without that traffic transiting the public internet where it could be observed, interrupted, interfered with, etc. Moreover, in some examples, the backend resources (here, ML models 134) can remain operating in their own VPC 122B without necessarily requiring the VPC 122B to be configured with internet access.

The secure communications channel can include use of a private connectivity endpoint 124 deployed in the "source" VPC 122A along with the data plane components 112. A private connectivity endpoint 124, such as one provided via a system like AWS PrivateLink, can be quickly deployed to allow resources in a source VPC to connect to services (or resources) in other VPCs using private IP addresses, as if those services were hosted directly in the source VPC. For example, the control plane 116 can issue a call to another service control plane of the provider network to deploy such a private connectivity endpoint 124 linking the VPC 122A to VPC 122B, where VPC 122B may have already been enabled for such connectivity by a manager/administrator of that VPC 122B (such as by deploying a network load balancer 128 routing component 126, resulting in an "endpoint service" being created, though other techniques can be implemented or supported). Thus, the control plane 116 can act as a service consumer and create a VPC endpoint to connect the VPC 122A to the endpoint service (e.g., a network load balancer 128 of VPC 122B). The VPC endpoint can be implemented in a variety of ways, such as adapting it as an "interface" endpoint that sends TCP traffic to the endpoint service (e.g., resolved using DNS), as a gateway load balancer endpoint that sends traffic to a fleet of virtual appliances using private IP addresses, etc.

In some examples, a service provider adds permissions so that service consumers can access the endpoint service. The service consumer may then initiate a connection and the service provider accepts or rejects the connection request.

Further, in some examples using interface private connectivity endpoints, service consumers can use endpoint polices to control which principals/users can use the endpoint to access an endpoint service.

Accordingly, traffic from the source VPC 122A may then be sent to the endpoint service (e.g., into VPC 122B) using a connection between the private connectivity endpoint 124 and the endpoint service (e.g., which could be "hosted" or "managed" by a network load balancer 128 or another component of the VPC 122B). Traffic between the private connectivity endpoint 124 and the endpoint service notably stays within the cloud provider network, without traversing the public internet, providing enhanced security.

Additionally, to eliminate the need for the data plane components 112 to closely track the exact locations and instances of the various ML models 134, in some examples the secure communications channel also includes an application load balancer 130 component (e.g., another routing component 126) deployed in the VPC 122B hosting the ML models. An application load balancer, or ALB, can be implemented as a software-based load balancer that operates at the application layer of the OSI model and distributes incoming traffic (e.g., HTTP traffic, HTTPS traffic) across multiple targets. Thus, an ALB can operate at the request level (e.g., the "application layer" or layer 7 of the OSI model), routing traffic to targets (compute instances, containers, IP addresses, on-demand functions, etc.) based on the content of the request. ALBs can be ideal for advanced load balancing of HTTP and HTTPS traffic and provide advanced request routing targeted at delivery of modern application architectures, including microservices and container-based applications. Beneficially, an ALB 130 can simplify and improve the security of a system, e.g., by ensuring that the latest SSL/TLS ciphers and protocols are used at all times.

In some examples, the ALB 130 can be configured to use content-based routing to route traffic to the ML models 134. For example, an ALB can route a request to a destination based on the content of the request, such as a Host field, Path URL, HTTP header, HTTP method, Query string or Source IP address. In some examples, the ALB can be configured to route requests using path-based routing, in which the URL "path" in a request (of the HTTP header) is used to determine the destination. As is known to those of skill in the art, a path of a URI (e.g., a URL) may be a portion of the URI after a domain name and before an optional query, which may represent a physical file location on a server or act as an abstraction. For example, a URI of http://www.example.com:80/path/to/myfile.html?key1=value1&key2=value2#Place may have a path of "/path/to/myfile.html", where "www.example.com" is the domain name and "?key1=value1&key2=value2" is the query.

Accordingly, without needing specific information about the deployment specifics of the underlying ML models 134 it needs to reach, the data plane components 112 can be adapted to simply send requests, destined to the private connectivity endpoint 124, including a specially formed path designating the resource (e.g., an ML model) it seeks to utilize. In some examples, a single "static" path can be used such as when a single model group 132 is to be used, though in other examples the data plane components 112 can use different path values to purposefully direct their traffic to different recipients. For example, the data plane components 112 could alternate between multiple (e.g., two, three, or more) different path values that are mapped to multiple (e.g., two, three, or more) different models, should the data plane components 112 themselves want to implement a simple load balancing approach. Additionally, or alternatively, the data plane components 112 may support multi-experience experiments by directing traffic to different recipients (e.g., ML models 134) based on which experience is needed for a particular request.

For example, as shown in circle (1), a user 102B (such as an administrator type persona) via computing device 104B may interact with the control plane 116—and specifically, an experiment control plane 118—to define experiment configuration data 120 to be used to create and manage an experiment involving the service 110. In some examples, this experiment configuration data 120 defines different experiences for users in some manner. For example, the experiment configuration data 120 may indicate that two experiences are to be defined for users, such as a "control" group with a first experience (e.g., backed by a first ML model) and a "treatment" group with a second experience (e.g., backed by a different ML model). The experiment configuration data 120 may thus provide "dial-up" configuration data such as an indication of which users are to receive which experience, which may include an indication of a percentage of users are to belong to a first cohort (each getting the "control" group experience) and which percentage of users are to belong to a second cohort (each getting the "treatment" group experience). This experiment configuration data 120 may optionally identify the particular "path" values to be used in requests to route them to the right model (and then the control plane or the user may similarly configure the ALB with this mapping), though in other examples the experiment control plane 118 can generate unique path values itself (and configure the ALB 130 with this information, too). The experiment configuration data 120 may also include, associated with experience, an identifier of the ML model 134 (or model group 132) to be used for that experience, such as a unique identifier of the model like a resource name, model instance identifier, virtual machine identifier (that is running the model), a network address, or the like.

Accordingly, at circle (2), the experiment control plane 118 can configure an experience selector 114 used by the data plane components 112 and/or configure an ALB 130 (e.g., with "path" to resource mappings associating a request's path with the desired target/destination model). In some examples, the configuration of the experience selector 114 includes providing indications of one or more of: the number of experiences for an experiment, which "path" values are to be used for requests for each experience, an identifier of the private connectivity endpoint 124 (e.g., its hostname or network address) to direct requests to, a percentage of users to be placed in each experience or specific user identifiers to be placed in an experience, a date and/or time that the experiment is to start and/or end, an identifier of whether metric generation is to occur (and/or a destination for such metrics), etc.

The experience selector 114 is illustrated as being a part of the data plane components 112, and thus could be implemented as a software library or plugin in some cases. In other examples, the experience selector 114 can be implemented as a separate service or micro-service, which could be deployed within the VPC 122A or even elsewhere in the provider network 100.

Thereafter, with the ML models 134 being hosted and this experiment configuration having occurred, the experiment can be begun. As shown at circle (3), a user 102A (e.g., an end user, such as a developer using an IDE application 108 on their computing device 104A) may use the application 108 and cause a request to be originated to the data plane components 112 of the service 110. This can be a variety of types of requests, such as a request to utilize some sort of machine learning, perhaps in this example to generate a code completion based on some input computer source code that the user has already written. This can be performed via a particular API request (e.g., a "generate completion" call).

Based on this received call, the data plane components 112 at circle (4) can determine if any active experiments are associated with the call. For example, the data plane components 112 may call the experience selector 114 to determine which, if any, experiments are associated with the type of request. This can include passing in some or all of the original request (e.g., including the payload and/or request type—"generate completion") and optionally other data such as user identifier information, such as that provided by an Identity and Access Management (IAM) non-illustrated system (of the cloud provider network or another network) that the user logged into (to access the cloud provider network 100), a user-provided token or credential, etc. By way of example, the experience selector 114 may maintain logic (e.g., a lookup data structure) indicating whether a particular type of request (potentially along with other logic, such as a particular type of request for a particular type or collection of users) is associated with an experiment.

When an experiment is enabled, as indicated in additional detail later herein, in some examples the experience selector 114 can "map" users into particular spaces, here referred to as "buckets", in a deterministic manner. For example, the experience selector 114 may use a consistent hashing algorithm known to those of skill in the art (e.g., a SHA or MD5 hash or the like) that can be used to generate a consistent output value based on a consistent input—e.g., a user identifier (e.g., a username). By way of example, a hash function can be used with the user identifier (or similar, unchanging value for a particular user) to generate a value, which itself can be transformed (e.g., by examining a last number of bits or bytes of the value) into a bucket identifier. As one example, this can result in a bucket identifier being consistently generated within some range (e.g., 0-999) for a particular user, though bucket identifiers can be integers, strings, or other types of values in various examples.

With this bucket identifier, the experience selector 114 can determine which "cohort" (or experience) of the experiment the user belongs to. In some examples, the experiment configuration data 120 identifies (or includes logic or instructions for identifying) a particular set of bucket identifiers belonging to each available experience. For example, the experiment configuration data 120 may indicate that thirty percent (30%) of all users are to be in a first experience while seventy percent (70%) are to belong to a second experience. Thus, the experience selector 114 may somehow select thirty percent of the bucket identifier space as being in the first cohort—e.g., the first three hundred bucket identifiers (e.g., 0-299) are part of the first experience and the next seven hundred are part of the second experience (e.g., 300-999). Likewise, if an experiment is configured with Oct. 10, 1980 split among three different models, some number of buckets (e.g., 1-100) will ultimately get mapped to a first ML model 'A', buckets 101-200 may get mapped to a model 'B', and buckets 201-1000 may be mapped to a third model 'C'. Alternatively, the experience selector 114 could randomly designate ones of these bucket identifiers as belonging to each cohort according to the defined percentages—e.g., some random collection of three hundred bucket identifiers between 0-999 belong to a first experience, while the rest belong to the second experience.

Upon identifying an experience for the user request, the experience selector 114 can provide, to the data plane components 112, an identifier of the experience allowing the data plane components 112 to construct a request to be sent to the associated backend resource (e.g., ML model 134), or may itself construct such a request or data for the request (e.g., a path to be used in the request). As one example, per the configuration at circle (2), the experience selector 114 may identify a path value associated with the selected experience (e.g., via a data structure mapping the two), and return this path value to the data plane components 112. The data plane components 112 may then construct a request for processing (e.g., an inference request) to be sent to the ML model, e.g., by sending a request for a resource to a domain associated with the models (that can be resolved to lead to the private connectivity endpoint 124) or to a known IP address of the private connectivity endpoint 124, together with the returned path value (e.g., "/model/X1/").

At circle (5), this request is received at the private connectivity endpoint 124, which causes it to be passed on to the target VPC 122B. In some examples, this causes the request to arrive at a network load balancer 128, which passes it on to an application load balancer 130. At circle (6), based on the configured "path values to destinations" mapping provided earlier (with regard to circle (2)), the application load balancer 130 can utilize path-based routing to route the request to the particular ML model (e.g., ML model 134N) corresponding to the path within the request. At circle (7), that ML model 134N can receive the request and process the request (e.g., by using payload data to generate an inference) to yield an output. Thereafter, the output can be passed back to the data plane components 112 in a response, which itself is used to construct a response to be passed back to the application 108.

Figure 2:
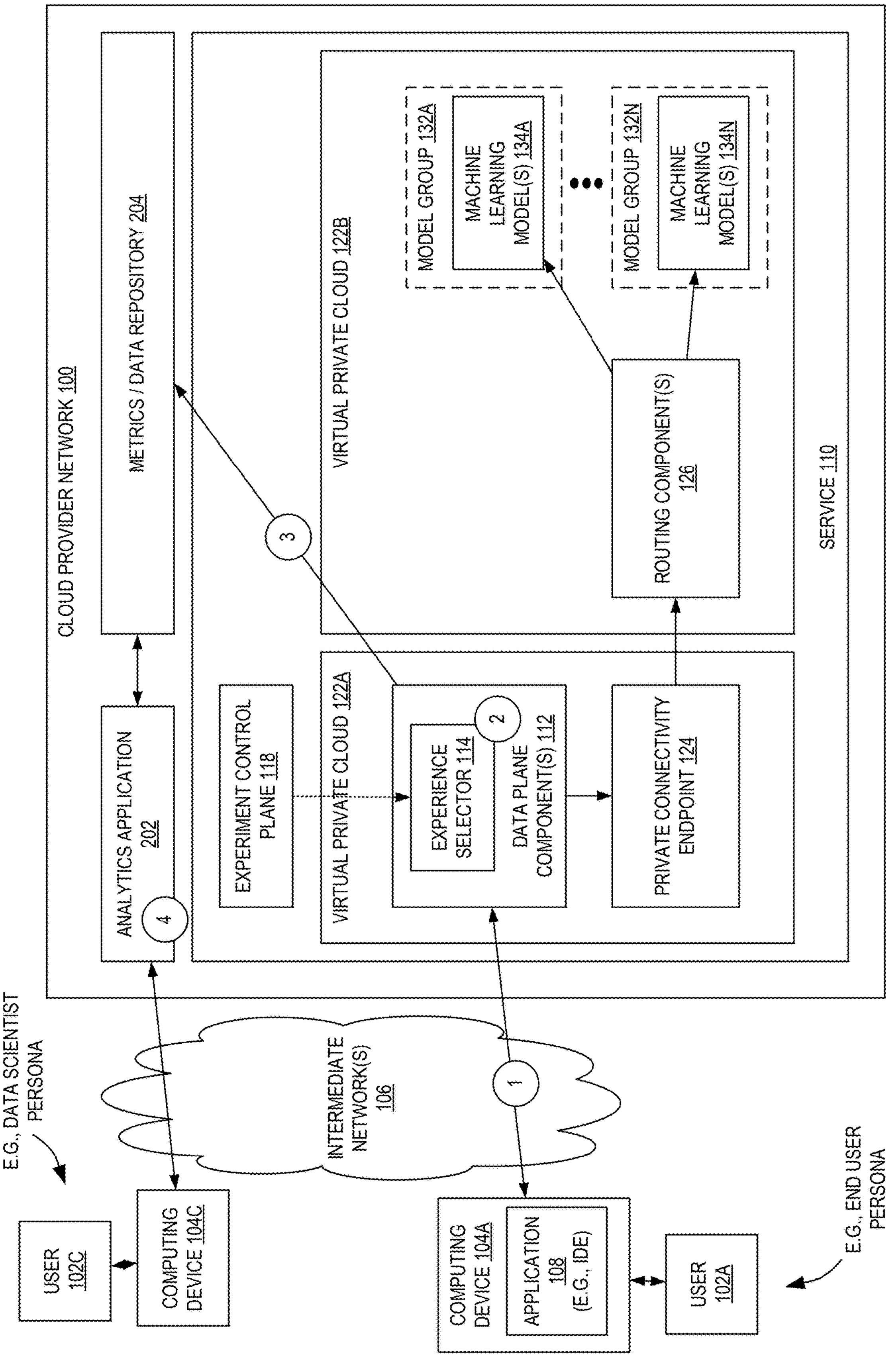
FIG. 2 is a diagram illustrating experience-specific metric collection and querying in an environment for secure multi-model hosting and experimentation in a cloud provider network according to some examples.

As indicated herein, examples can be adapted to provide rich metrics allowing in-depth analysis of various experiments. FIG. 2 is a diagram illustrating experience-specific metric collection and querying in an environment for secure multi-model hosting and experimentation in a cloud provider network according to some examples. In some examples, the data plane components 112 can provide enhanced or enriched metrics that are linked to particular experiences and experiments, allowing investigation into how different experiences are performing.

For example, in some examples, as shown at circle (1) the application 108 is adapted to publish metrics/statistics (e.g., via sending "send telemetry" type API calls) to the data plane components 112 indicative of the performance of the application 108 (e.g., as part of an experience). This may occur, for example, according to a schedule (e.g., once every 5 or 10 or 30 minutes), according to a trigger (e.g., a particular event or action taking place, such as upon a response being returned by the service 110 as part of an experiment), etc. A variety of types of metrics can be collected and reported, such as a number of characters or lines that were generated by the service (e.g., as part of a code completion type action), a suggestion state (or "accepted state") indicating whether the user accepted or denied a particular suggestion generated by the service, and near limitless other types.

At circle (2), the data plane components 112 may receive this metric data and utilize the experience selector 114 to identify the particular experience (and/or experiment) it is associated with, such as by performing a mapping based on a user identifier of the user to determine a cohort/experience for the user related to a particular metric. For example, if a metric pertains to a particular response from a particular request the application 108 issued, the data plane components 112 can determine if there is an experiment associated with that type of request, and if so, identify which experience the user belongs to. An identifier of this experience can be obtained by the data plane components 112 and added to the related metrics (or, sent along with these metrics) and sent at circle (3) for storage and/or distribution by a metrics or data repository 204, such as a cloud monitoring service (e.g., AWS CloudWatch), an object storage service (e.g., Amazon S3), a data stream service (e.g., Amazon Firehose), a data warehouse, or the like. In this manner, the initial metrics provided by the application 108 are enriched by the data plane components 112 (via use of the experience selector 114) by adding in an identification of the associated experience and/or experiment.

In some examples, a data scientist type persona user 102C can directly access this metrics and/or data repository 204, though beneficially in some examples the user 102C can use an analytics application 202 (e.g., a "big data" processing service, a business intelligence service, an analytics suite, etc.) at circle (4) to analyze the metrics, which may be directly provided to (or acted upon by) the analytics application 202. For example, the user 102C can determine the various metrics for different "cohorts" of an experiment (e.g., those users operating under a particular experience versus other users operating under a different experience).

In some examples, as indicated herein, the experimentation need not be solely within the provider network 100 itself. Instead, as referred to herein as a "client-side" experience, the in-cloud service 110 can cause a user 102A computing device 104A to implement different functionalities as part of different experiences of an experiment.

Each application 108 may be adapted to interact with the data plane components 112 to determine which, if any, experiences it is to present to its user. For example, an application 108 may connect with the data plane components 112 as part of a login type phase, and may then send a "list feature evaluations" type API request seeking an indication of what experiences are active for the user. The data plane components 112 may respond with a message identifying any experiences, which may include code for the experience, an identifier of a feature (already installed or available to the application) to utilize, etc. The data plane components 112 can make this determination regarding what experiences are "active" for a user through use of the same experience selector 114 and user-to-bucket mapping techniques disclosed herein, whereby a user will consistently be mapped to a bucket and thus to various experiences.

Figure 3:
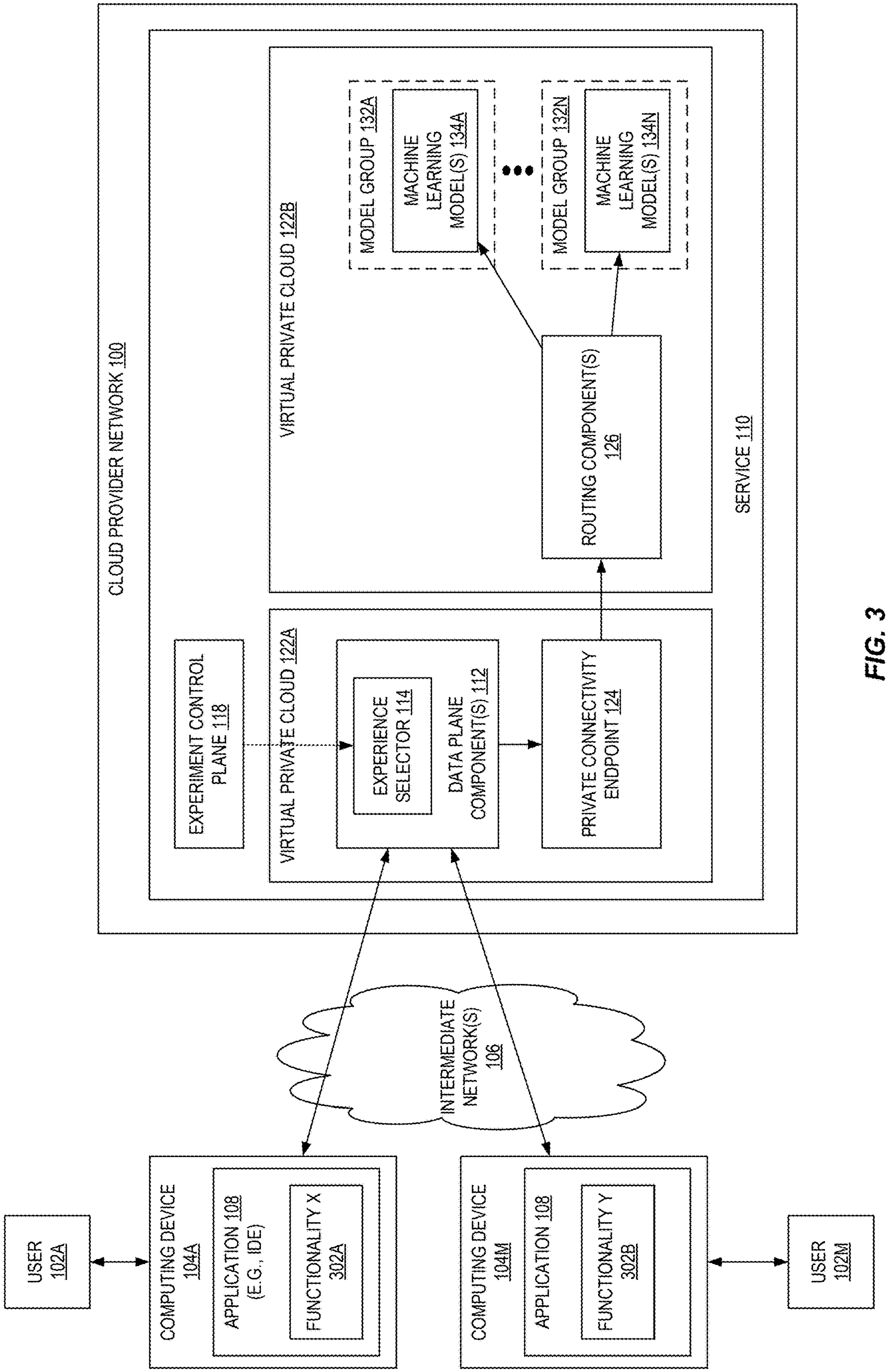
FIG. 3 is a diagram illustrating client-side experimentation in an environment for secure multi-model hosting and experimentation in a cloud provider network according to some examples.

FIG. 3 is a diagram illustrating client-side experimentation in an environment for secure multi-model hosting and experimentation in a cloud provider network according to some examples. As shown in FIG. 3, a first user 102A may thus have a first functionality 'X' 302A enabled (that corresponds to a first cohort of an experiment getting a first experience) while a second user 102M may have a second functionality 'Y' 302B enabled (that corresponds to a second cohort of the experiment getting a second experience). Such functionalities can flexibly be chosen and implemented by various involved users and can be nearly unlimited in what they can perform. As one example, a first functionality X 302A for sending a particular API request to the data plane components 112 to perform an inference (e.g., a code completion task) may cause the application 108 to send along, as input/context data, the contents of the current source code file that the user 102A is currently editing. In contrast, the second functionality 'Y' 302B may instead cause the application 108 to send along, as input/context data, the contents of the current source code file that the user 102B is currently editing along with the content of other files, such as other files in the same filesystem directory, other files in the same project, other files referenced by a current file, or the like. (Such different context data may or may not help a backend ML model 134 generate completions, which can be studied by setting up such an experiment.)

Powerfully, in some examples a single user (e.g., user 102A) may thus be subjected to both one or more client-side experiences as well as one or more service-side experiences, from multiple experiments, at a same point in time. Moreover, these "mappings" for the user into particular cohorts (and thus, experiences) will remain consistent provided that the dial-up configuration does not change, allowing proper experimentation and analysis.

Figure 4:
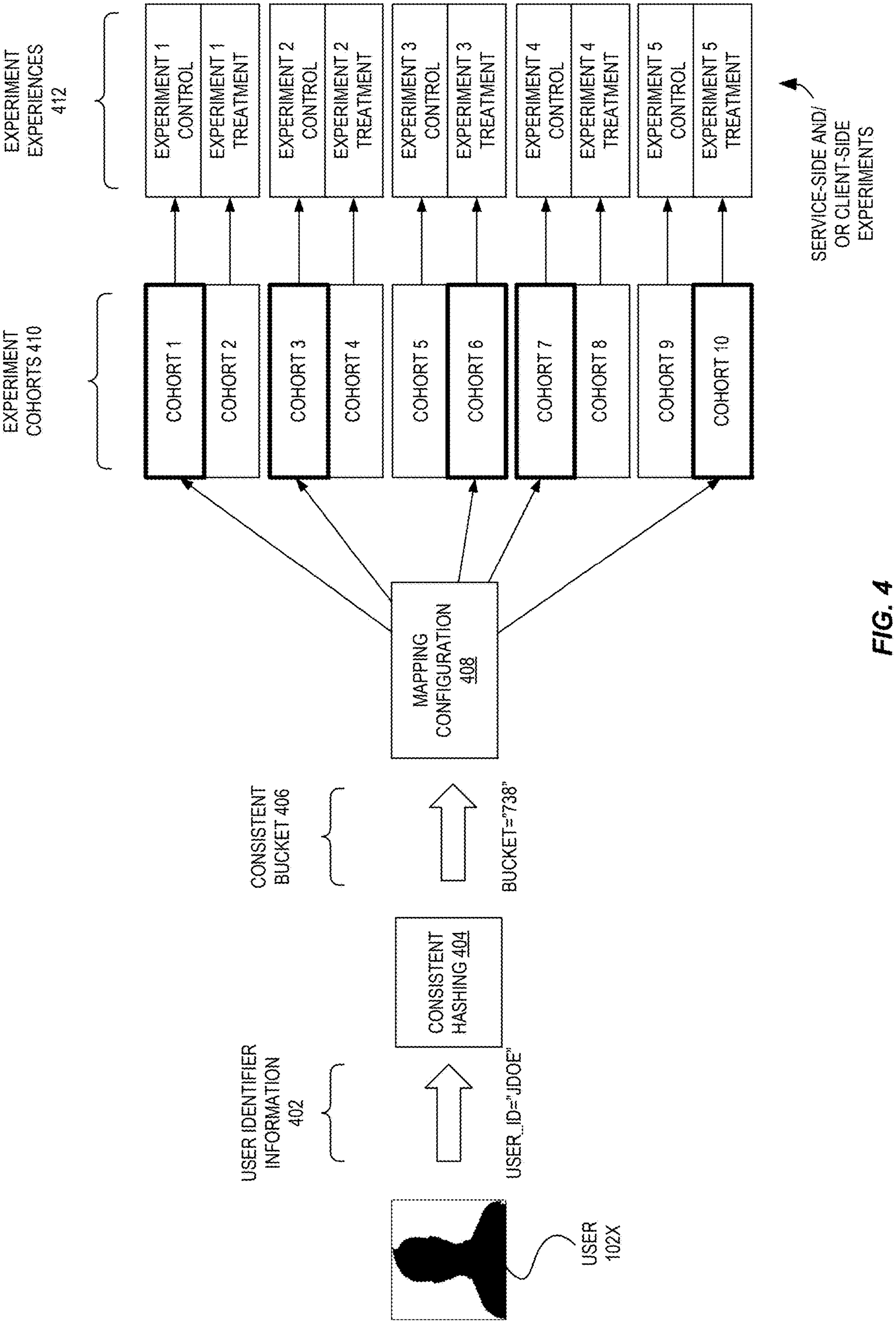
FIG. 4 is a diagram illustrating deterministic user cohort assignment for independent experimentation in a cloud provider network according to some examples.

FIG. 4 is a diagram illustrating deterministic user cohort assignment for independent experimentation in a cloud provider network according to some examples. As described throughout, a user can be consistently mapped to one or multiple experiences, for one or multiple experiments, using a consistent hashing scheme. For example, a user 102X may have a user identifier of "JDOE" (e.g., a user login name) serving as a user identifier information 402 that is used as input (e.g., by the experience selector 114) into a consistent hashing 404 based algorithm, leading to the identification of a consistent bucket identifier-here, "738."

Based on the provided experiment configuration data, mapping configuration 408 data can be used that maps various bucket identifiers to various experiences/cohorts. In this example, the user 102X is mapped, via the bucket identifier, to five different experiment cohorts 410 (1, 3, 6, 7, 10) corresponding to experiment experiences 412—here, experiment 1 control, experiment 2 control, experiment 3 treatment, experiment 4 control, and experiment 5 treatment. Notably, these experiences for a single cohort can include experiences that are client-side, service-side, or a mix of both.

Figure 5:
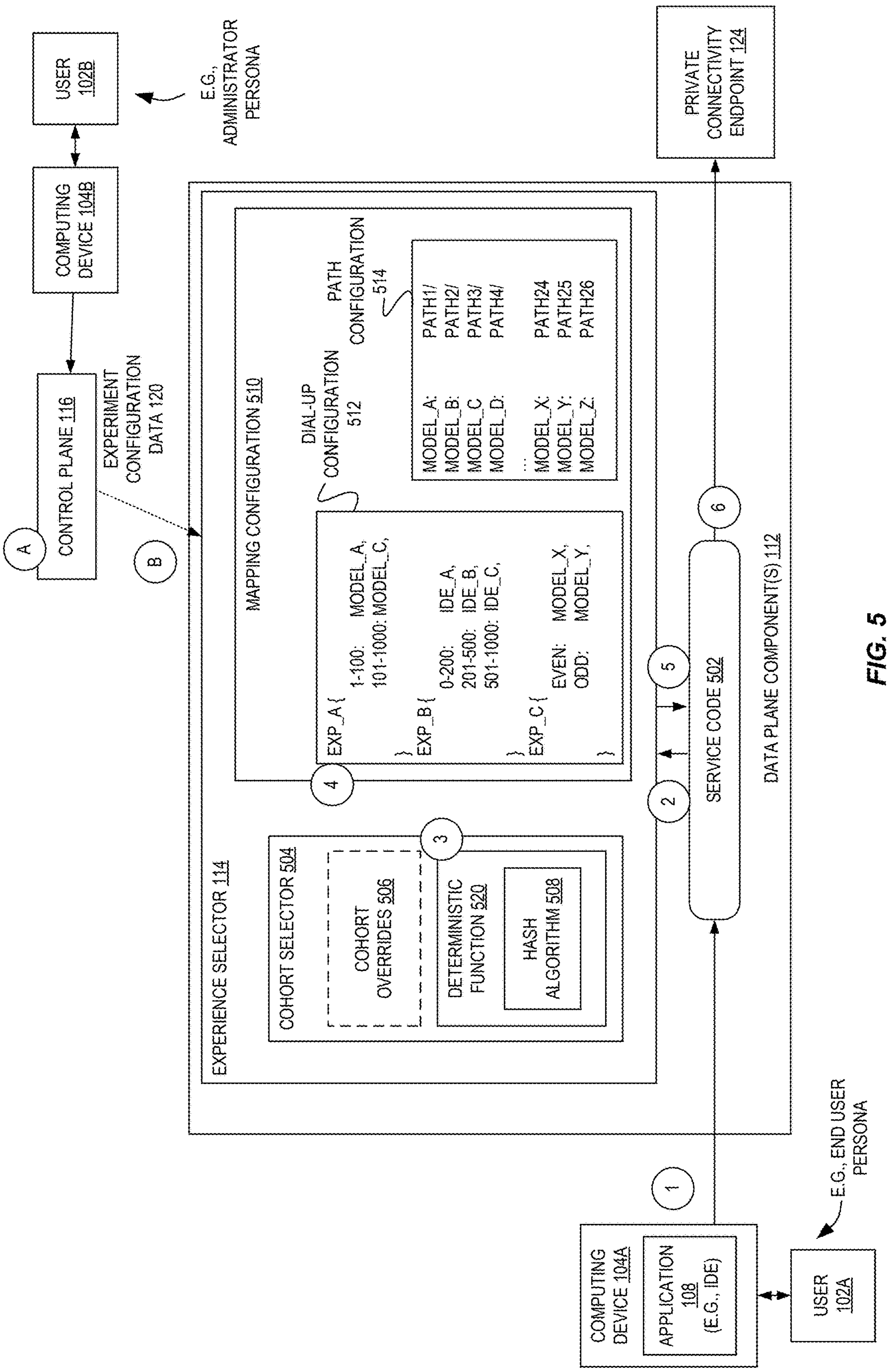
FIG. 5 is a diagram illustrating an example dial-up configuration and path configuration used for secure multi-model hosting and experimentation in a cloud provider network according to some examples.

For further detail on user-to-cohort mappings useful for experimentation and/or multi-model hosting scenarios, FIG. 5 is a diagram illustrating an example dial-up configuration and path configuration used for secure multi-model hosting and experimentation in a cloud provider network according to some examples. As indicated earlier, an administrator type persona may configure the system with experiment configuration data 120 by providing it to control plane 116 at circle (A), which thereafter configures the experience selector 114, ALBs, routing components, etc., accordingly.

A user 102A may thereafter utilize an application 108 that itself interacts with (or utilizes) a computing service at circle (1) by way of data plane components 112, such as by sending a request (e.g., an API call) seeking the performance of some action or set of actions. The data plane components 112 may include service code 502, which receive the request and optionally other data, such as information (e.g., a user identifier) provided by an identity and authentication management (IAM) system (not illustrated) that can authenticate and/or authorize the user 102A to be able to access the service. The service code 502 may then orchestrate or manage the processing of the request, such as via use of an experience selector 114, ML models, and/or other backend resources such as databases, data stores, or the like.

As shown, upon receipt of a request to perform some action (e.g., a "generate completions" API call seeking computer source code based on some fragment of computer source code provided by the user), at circle (2) the service code 502 can call (or otherwise utilize) the experience selector 114 to determine whether the request is subject to an experiment and/or which experience is to apply for the request.

In some examples, experience selector 114 utilizes a cohort selector 504 and a mapping configuration 510 to determine which experience applies for the request. As shown by circle (3), optionally the cohort selector 504 may utilize a set of cohort overrides 506 to first determine if the user is configured to be "fixed" to a particular experience. In some examples, such data can be provided as experiment configuration data 120, whereby an administrator may indicate that certain users or user groups are to use a specific experience. This may include, for example, an administrator type persona selecting (or inputting) an identifier of a user and selecting (or inputting) a particular experience (from multiple experiences of an experiment) that is always to be used for that user. A variety of different techniques can be utilized to identify particular users or groups of users to have such overrides in place; for example, a set of specific users can be identified (e.g., via unique user identifiers like usernames), a set of one or more user groups can be identified (e.g., via group identifiers such as a department or organization, each being associated with one or more users), an identity provider system can be identified (such that all users utilizing the identity provider are identified), a set of user job roles can be identified, a set of user locations can be identified, an account identifier can be identified (such as that of a large organizational "customer" of the provider network that is associated with a number of different user accounts) etc.

In examples where cohort overrides 506 are not utilized, or when no such override exists for a user, the cohort selector 504 can then utilize a deterministic function 520 to determine a bucket identifier for the user. A deterministic function is a function that, given a particular input, will always produce the same output, meaning that the function's output is based entirely, and only, on the input values provided to it and does not rely on any other (hidden) input or stored state to generate its output. The deterministic function 520 can be based on use of a hashing algorithm, which may be referred to herein as being a "consistent" hashing algorithm in that it is deterministic and always generates a same output given a same input. Example hash functions include cryptographic hash functions, such as SHA-256 or MD5, though many other types of hash functions are known and can be straightforwardly applied by those of skill in the art.

As described herein, a "bucket" can represent a slot (from multiple different possible slots) where one or more users are placed into in a deterministic or consistent manner, whereby those users in a particular slot are treated the same for the purpose of experimentation or multi-model hosting. In some examples, a set of buckets are utilized, which can be represented in a variety of ways, such as with integers in a range, like 1-1000. In such an example, a bucket identifier can be one of these integers—e.g., a bucket identifier of "6" means that the corresponding bucket is 6.

As shown, the deterministic function may include solely a hash algorithm 508 or may include other code that prepares input for the hash algorithm 508 and/or operates on the output of the hash algorithm 508. As one example, a user identifier (such as a username, or even a unique user identifier number) can be provided as the input to the hash algorithm 508, and then the output is further processed, also in a deterministic manner, to yield a bucket identifier. This can include, for example, generating an integer based on some number of the bytes or values of the output hash value—e.g., converting the last few characters of the hash value into integer form within some range. Many techniques for this transformation are known by those of skill in the art that can be chosen based on the preferences of the implementor.

In this example depicted in FIG. 5, there are one thousand (1000) buckets available for users to be mapped into by the cohort selector 504, and each bucket has a corresponding bucket identifier of a number between 1-1000. With a determined bucket identifier, mapping configuration 510 (also configured based on experiment configuration data 120) can be used at circle (4) to identify which experience is to be applied for the request. In this example, mapping configuration 510 includes dial-up configuration 512 data and path configuration 514 data. The dial-up configuration 512 includes a mapping between various active experiments (here represented as EXP_A, EXP_B, and EXP_C) and which bucket identifiers for those experiments are "mapped" to which experiences. Here, bucket identifiers for EXP_A are split such that bucket identifiers 1-100 are to use a first experience (utilizing "MODEL_A") while bucket identifiers 101-1000 are to use a second experience (utilizing "MODEL_B"). Likewise, for EXP_B, bucket identifiers 0-200 are mapped to experience "IDE_A", bucket identifiers 201-500 are mapped to experience "IDE_B", while bucket identifiers 501-1000 are mapped to experience "IDE_C". Notably, ranges of bucket identifiers need not be used, and thus bucket identifiers may be randomly grouped and associated with a particular experience—e.g., bucket identifiers 1, 4, and 17 may be mapped to a first experience. As another example, all odd bucket identifiers may be mapped to experience "MODEL_Y" for a third experiment EXP_C while even bucket identifiers are mapped to experience "MODEL_X".

In some examples, the particular experiment to be used (and thus, the particular bucket identifier-to-experience mappings to be used) can be selected based on the type of the request. For example, a "generate completions" type of request may be mapped to a first experiment (e.g., EXP_A) while another type of request (e.g., "answer question") may be mapped to a second experiment (e.g., EXP_B).

Accordingly, by identifying the experiments associated with the request, the generated bucket identifier (from the deterministic function 520 or from the cohort overrides 506) can be used to identify the experience. Here, for example, we assume that the request type is mapped to EXP_A, and that the bucket identifier is 233—this results in experience for "MODEL_C" being selected.

With this selection, path configuration 514 can be utilized to determine how to provide the experience. Here, the experience involves the use of a particular backend ML model, referred to as MODEL_C. Thus, the experience identifier (MODEL_C) can be used to lookup a path component to be used in a request, allowing path-based routing to be utilized to route such a request to the intended model. Here, MODEL_C is mapped to a path of "PATH3/", which is a string value that can be used as part of a URI or other application layer resource identifier. This path value is returned at circle (5) to the service code 502, optionally with indicators of the bucket identifier (233), the experiment identifier (EXP_A), the experience identifier (MODEL_C), etc.

With this information, the service code 502 can generate and transmit a request at circle (6) to perform an inference for the user's request according to the selected experience. This request includes the use of a URI including the returned path component value—e.g., "http://www.example.com/

PATH3/" or "192.168.0.55/PATH3". Using the configured secure communications channel, this request is sent to the private connectivity endpoint 124, which passes it onto a separate protected VPC including the models, and thereafter routed, using path-based routing, by an ALB (based on identifying the "PATH3/" of the path component of the URI on to the ML model corresponding to MODEL_C. The inference is thus generated by use of that model, returned to the service code 502, and ultimately used to construct a response back to the calling application 108.

Figure 6:
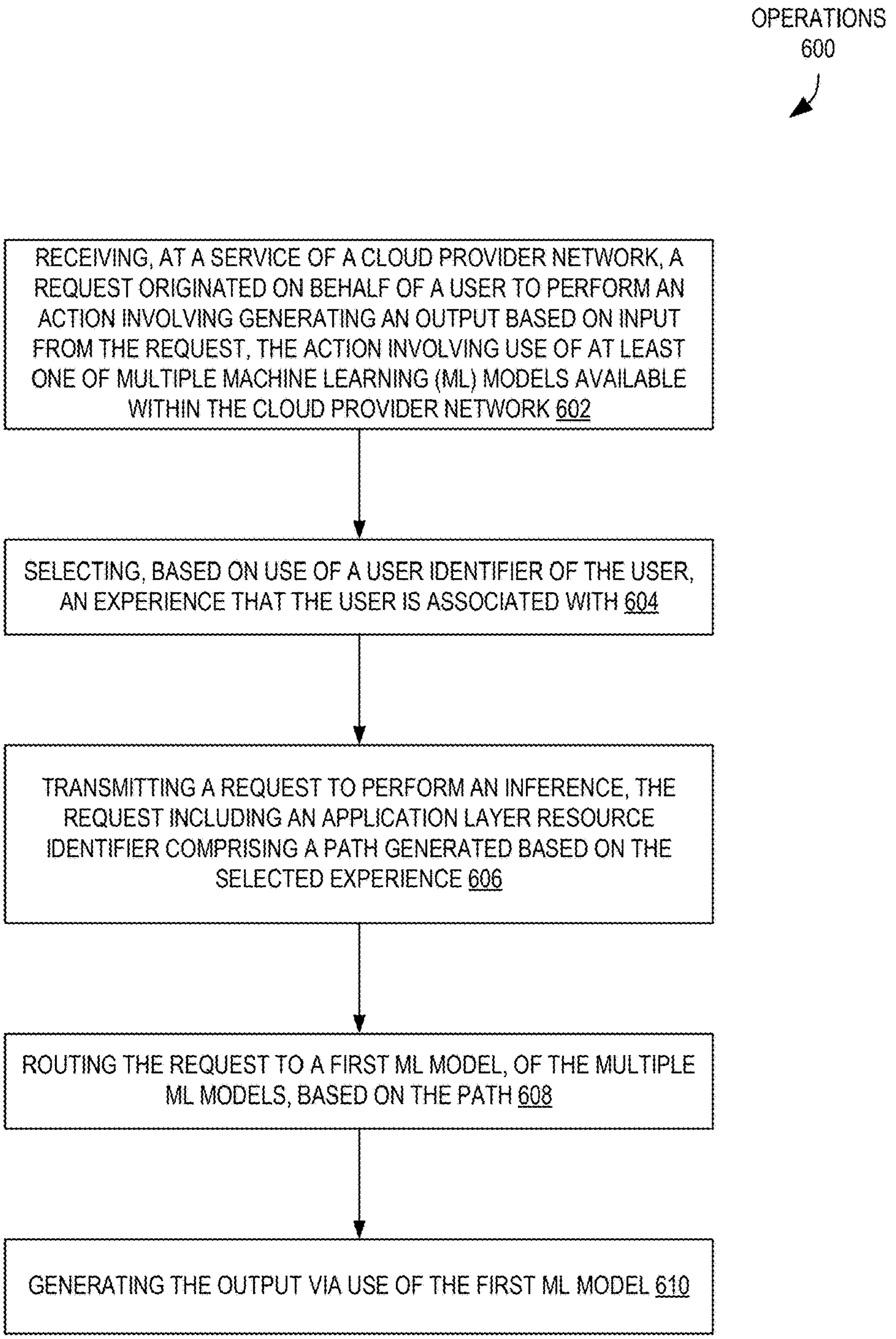
FIG. 6 is a flow diagram illustrating operations of a method for secure multi-model hosting and experimentation in a cloud provider network according to some examples.

FIG. 6 is a flow diagram illustrating operations 600 of a method for secure multi-model hosting and experimentation in a cloud provider network according to some examples. Some or all of the operations 600 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the service 110 of the other figures.

The operations 600 include, at block 602, receiving, at a service of a cloud provider network, a request originated on behalf of a user to perform an action involving generating an output based on input from the request, the action involving use of at least one of multiple machine learning (ML) models available within the cloud provider network. The requested may specify an action such as "generate a completion" (e.g., of computer source code based on other provided code or an instruction), generate a prediction/inference, generate a response to a question, generate text, generate an image or video, etc., involving the use of one or more of the ML models, which may be generative ML models. In some examples, the requested action may alternatively involve different "techniques" or "functionalities" that may not involve the use of any ML models.

The operations 600 further include, at block 604, selecting, based on use of a user identifier of the user, an experience associated with the user. The experience, in some examples, is part of a first experiment involving the multiple ML models, and the operations further include selecting, based on use of the user identifier of the user, a second experience associated with the user, wherein the second experience is part of a second experiment that is different than the experiment. In some examples, the operations further include transmitting, to a client device associated with the user, a command indicating that the client device is to enable a functionality associated with the second experience.

In some examples, block 604 comprises utilizing a deterministic algorithm to generate a bucket identifier. In some examples, the deterministic algorithm comprises a consistent hashing algorithm, and wherein utilizing the deterministic algorithm comprises utilizing at least the user identifier as an input to the consistent hashing algorithm as part of generating the bucket identifier. In some examples, block 604 further comprises identifying, based on the bucket identifier and further based on an identifier of an experiment associated with the action, the first ML model or a component (e.g., a string value) for the path.

The operations 600 further include, at block 606, transmitting a request to perform an inference, the request including an application layer resource identifier comprising a path generated based on the selected experience.

The transmitted request, in some examples, is sent within a cloud private network, from a data plane component operating in the cloud private network, to a private connectivity endpoint that is also in the cloud private network, wherein the private connectivity endpoint provides connectivity to a second cloud private network without transiting the public internet, wherein the first ML model operates within the second cloud private network. In some examples, routing the request includes processing the request via an application layer load balancer via path-based routing, wherein the application layer load balancer operates within the second cloud private network.

The operations 600 further include, at block 608, routing the request to a first ML model, of the multiple ML models, based on the path. The operations 600 further include, at block 610, generating an output via use of the first ML model.

The operations further include, in some examples, receiving, at the cloud provider network, user-specified dial-up configuration data for an experiment, the dial-up configuration data indicating how to consistently split users between at least a first experience and a second experience, wherein the first experience is associated with the first ML model and the second experience is associated with a second ML model, wherein the selected experience comprises the first experience, and wherein the selecting of the experience is based on use of at least some of the dial-up configuration data.

In some examples, the operations further include generating a first set of metrics associated with activity of at least the user that indicate that the activity corresponds to the experience; and generating a second set of metrics associated with activity of at least another user that indicate that the activity corresponds to a second experience, wherein the experience and the second experience are part of a same experiment.

The user in some examples is further associated, via a same bucket identifier, with a second experience of a second experiment. In some examples, the experience involves a service-side (or "server-side") functionality, the second experience involves a client-side functionality, and both the experience and the second experience are concurrently active.

In some examples, a multi-model hosting (MMH) architecture is used in a similar manner to utilize ones of a collection of ML models to service user requests. For example, based on analyzing a user's request, the request can be deterministically mapped to a particular ML model from the collection, which can be based on use of a deterministic function with data from the request (or associated with the request) that may not change for a particular user or source—e.g., a device identifier, a user identifier, a source network address, or the like. Alternatively, an ML model can be selected for a request in another manner, such as by selecting a "least busy" model according to some tracked metric, such as a number of recent requests sent to the ML models or a load of the instances hosting these models. Thus, with a selected model, the request can be securely and efficiently directed toward the model using a path-based routing approach as described herein.

Figure 7:
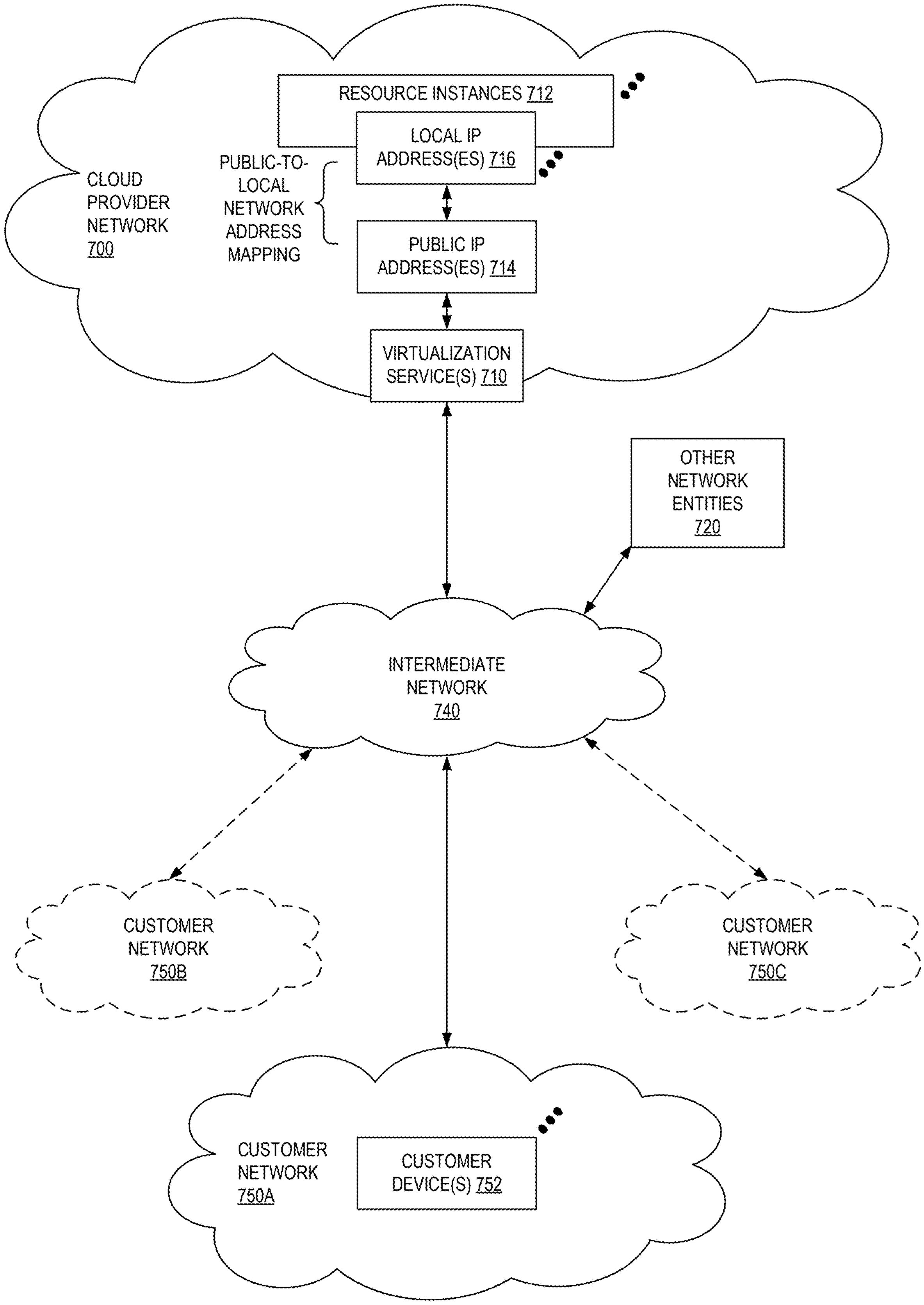
FIG. 7 illustrates an example cloud provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
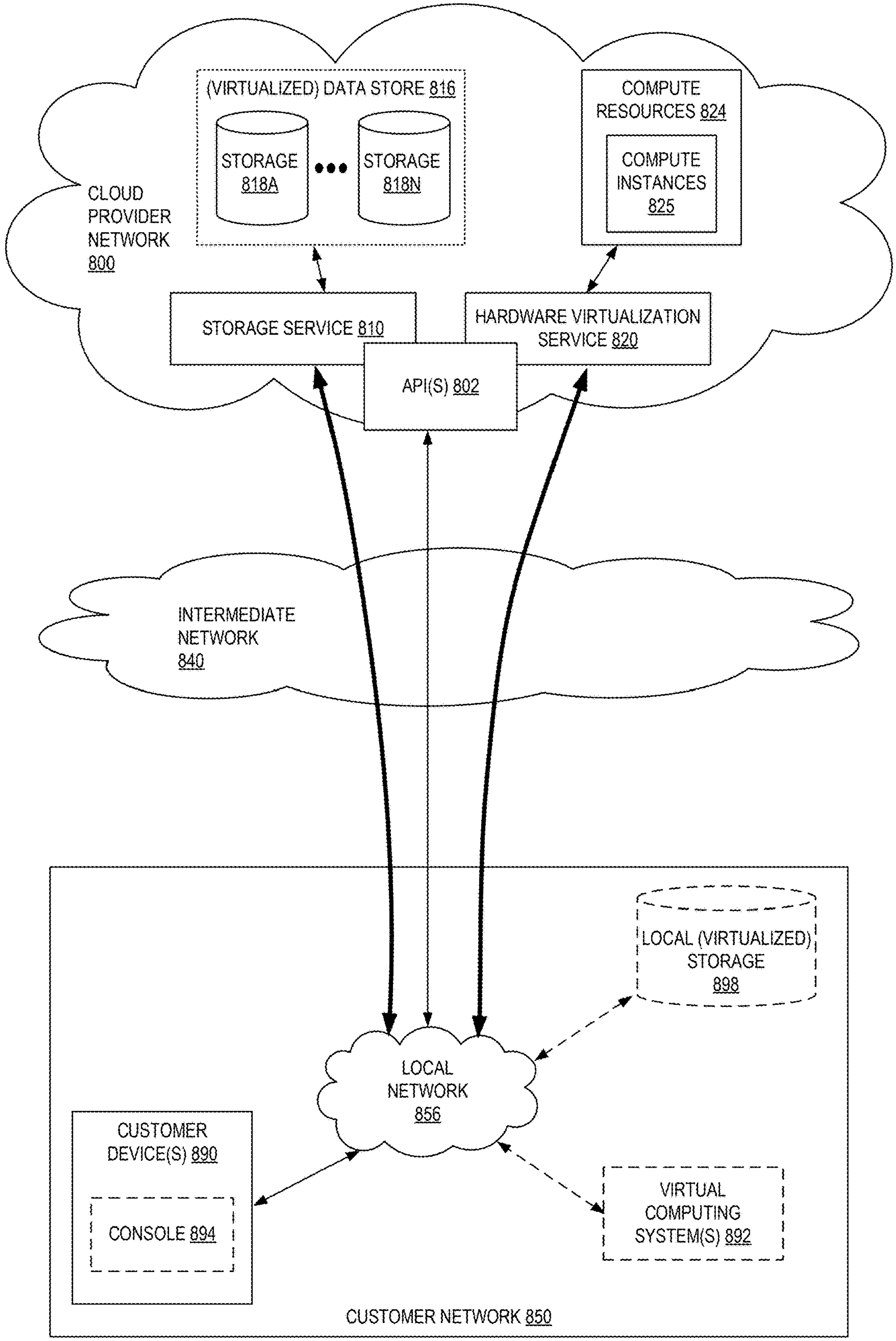
FIG. 8 is a block diagram of an example cloud provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
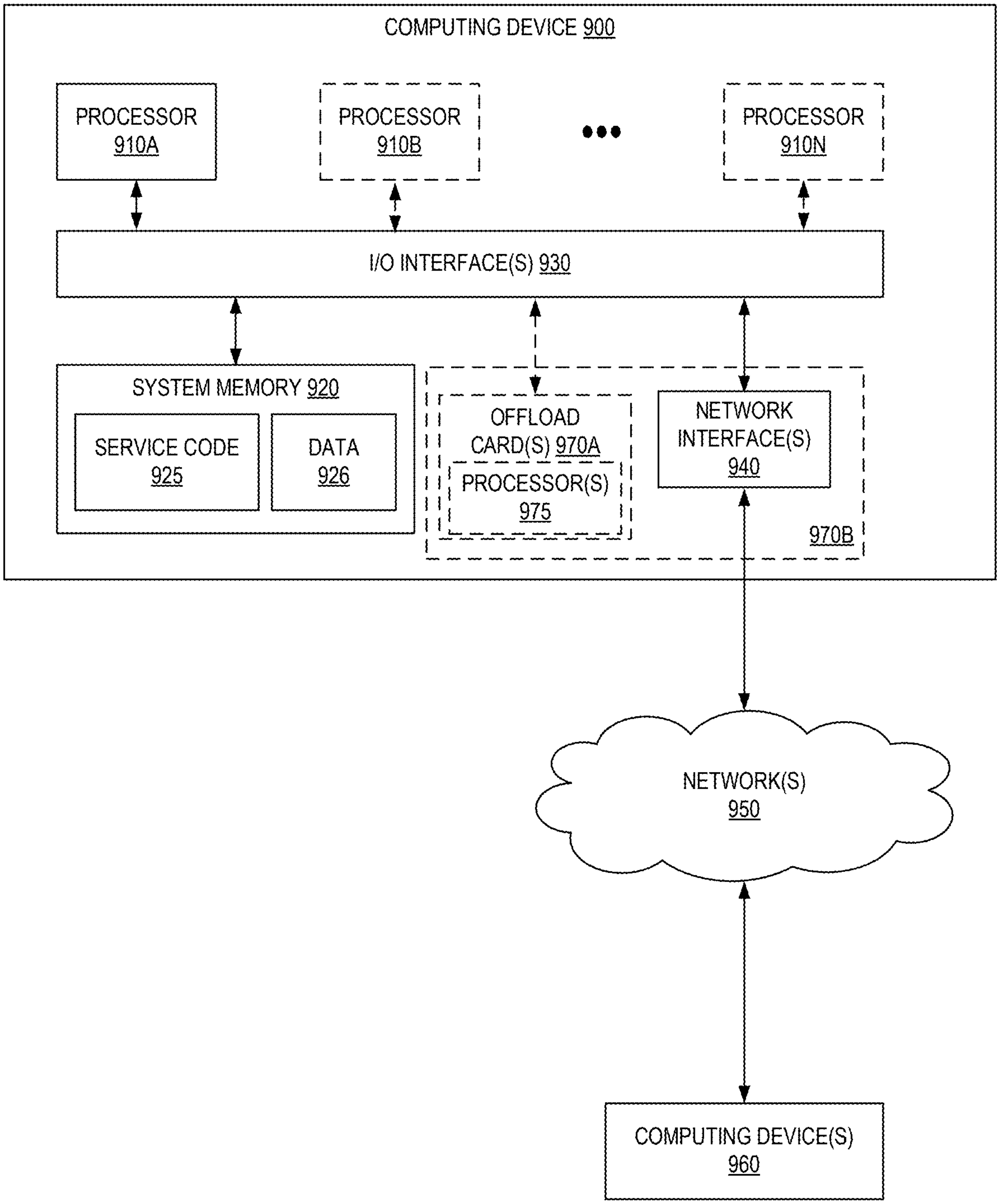
FIG. 9 is a block diagram illustrating an example computing device that can be used in some examples.

In some examples, a system that implements a portion or all of the techniques described herein can include a general-purpose computer system, such as the computing device 900 (also referred to as a computing system or electronic device) illustrated in FIG. 9, that includes, or is configured to access, one or more computer-accessible media. In the illustrated example, the computing device 900 includes one or more processors 910 coupled to a system memory 920 via an input/output (I/O) interface 930. The computing device 900 further includes a network interface 940 coupled to the I/O interface 930. While FIG. 9 shows the computing device 900 as a single computing device, in various examples the computing device 900 can include one computing device or any number of computing devices configured to work together as a single computing device 900.

In various examples, the computing device 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as service code 925 (e.g., executable to implement, in whole or in part, the service 110) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computing device 900 and other computing devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computing device 900. However, in some examples the virtualization manager implemented by the offload card(s) 970A or 970B can accommodate requests from other entities (e.g., from compute instances themselves), and cannot coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving, at a service of a cloud provider network, a request from a user to generate source code;

selecting, based on a user identifier of the user, an experience associated with the user, wherein the selecting comprises:

generating a bucket identifier via use of a deterministic function, and identifying the experience based on use of the bucket identifier;

generating an application layer resource identifier comprising a path, wherein the path includes a path component that corresponds to the identified experience;

transmitting a request to perform an inference to a private connectivity endpoint, the request including the application layer resource identifier comprising a uniform resource locator (URL) address;

routing the request to a first generative machine learning (ML) model, of multiple generative ML models, based on the path component in the URL, wherein:

the routing is performed by an application layer load balancer that uses application-layer routing rules, including path-based routing rules, to select among the multiple generative ML models, the private connectivity endpoint provides access to each of the multiple generative ML models and different path components in the URLs route to different generative ML models, and the request is routed entirely within the cloud provider network and does not transit the public internet;

generating an output via use of the first generative ML model, the output comprising the source code; and transmitting the output to a computing device of the user to be presented.

2. The computer-implemented method of claim 1, further comprising:

receiving, at the cloud provider network, user-specified dial-up configuration data for an experiment, the dial-up configuration data indicating how to consistently split users between at least a first experience and a second experience, wherein the first experience is associated with the first ML generative model and the second experience is associated with a second ML generative model, wherein the selected experience comprises the first experience, and wherein the selecting of the experience is based on use of at least some of the dial-up configuration data.

3. The computer-implemented method of claim 1, wherein the transmitted request is sent within a cloud private network, from a data plane component operating in the cloud private network, to a private connectivity endpoint that is also in the cloud private network, wherein the private connectivity endpoint provides connectivity to a second cloud private network without transiting the public internet, wherein the first generative ML model operates within the second cloud private network.

4. A computer-implemented method comprising:
- receiving, at a service of a cloud provider network, a request originated on behalf of a user to perform an action involving generating an output based on input from the request, the action involving use of at least one of multiple machine learning (ML) models available within the cloud provider network;
- selecting, based on a user identifier of the user, an experience associated with the user;
- generating an application layer resource identifier comprising a path, wherein the path includes a path component that corresponds to the selected experience;
- transmitting a request to perform an inference to a private connectivity endpoint, the request including the application layer resource identifier;
- routing the request, by an application layer load balancer using application-layer routing rules, including path-based routing rules, to a first ML model of the multiple ML models based on the path component; and
- generating the output via use of the first ML model.

5. The computer-implemented method of claim 4, wherein selecting the experience associated with the user comprises utilizing a deterministic algorithm to generate a bucket identifier.

6. The computer-implemented method of claim 5, wherein the deterministic algorithm comprises a consistent hashing algorithm, and wherein utilizing the deterministic algorithm comprises utilizing at least the user identifier as an input to the consistent hashing algorithm as part of generating the bucket identifier.

7. The computer-implemented method of claim 6, wherein selecting the experience further comprises identifying, based on the bucket identifier and further based on an identifier of an experiment associated with the action, the first ML model or a component for the path.

8. The computer-implemented method of claim 4, further comprising:
- receiving, at the cloud provider network, user-specified dial-up configuration data for an experiment, the dial-up configuration data indicating how to consistently split users between at least a first experience and a second experience, wherein the first experience is associated with the first ML model and the second experience is associated with a second ML model,
- wherein the selected experience comprises the first experience, and
- wherein the selecting of the experience is based on at least some of the dial-up configuration data.

9. The computer-implemented method of claim 4, wherein the transmitted request is sent to the private connectivity endpoint within a cloud private network, from a data plane component operating in the cloud private network, to a private connectivity endpoint that is also in the cloud private network, wherein the private connectivity endpoint provides connectivity to a second cloud private network without transiting the public internet, wherein the first ML model operates within the second cloud private network.

10. The computer-implemented method of claim 9, wherein routing the request includes processing the request via the application layer load balancer using application-layer routing rules, including path-based routing rules, wherein the application layer load balancer operates within the second cloud private network.

11. The computer-implemented method of claim 4, wherein the experience is part of a first experiment involving the multiple ML models, and wherein the method further comprises:
- selecting, based on the user identifier of the user, a second experience associated with the user, wherein the second experience is part of a second experiment that is different than the experiment.

12. The computer-implemented method of claim 11, further comprising:
- transmitting, to a client device associated with the user, a command indicating that the client device is to enable a functionality associated with the second experience.

13. The computer-implemented method of claim 4, further comprising:
- generating a first set of metrics associated with activity of at least the user that indicate that the activity corresponds to the experience; and
- generating a second set of metrics associated with activity of at least another user that indicate that the activity corresponds to a second experience,
- wherein the experience and the second experience are part of a same experiment.

14. The computer-implemented method of claim 4, wherein the user is further associated, via a same bucket identifier, with a second experience of a second experiment.

15. The computer-implemented method of claim 14, wherein the experience involves a server-side functionality, the second experience involves a client-side functionality, and both the experience and the second experience are concurrently active.

16. A system comprising:
- a first one or more computing devices to implement a control plane of a service in a cloud provider network, the control plane including instructions that upon execution cause the control plane to:
  - receive user-specified experiment configuration data; and
  - configure one or more components of a data plane based on the user-specified experiment configuration data;
- a second one or more computing devices to implement the data plane of the service in the cloud provider network, the data plane including instructions that upon execution cause the data plane to:
  - receive a request originated on behalf of a user to perform an action involving generation of an output based on input from the request, the action involving use of at least one of multiple machine learning (ML) models available within the cloud provider network;
  - select, based on a user identifier of the user, an experience associated with the user;
  - generate an application layer resource identifier comprising a path, wherein the path includes a path component corresponding to the selected experience;
  - transmit a request to perform an inference to a private connectivity endpoint, the request including the application layer resource identifier;
  - route the request, via an application layer load balancer using application-layer routing rules, including path-based routing rules, to a first ML model of the multiple ML models based on the path component; and
  - generate the output via use of the first ML model.

17. The system of claim 16, wherein to select the experience associated with the user, the data plane is at least to utilize at least the user identifier as an input to a consistent hashing algorithm as part of generating a bucket identifier.

18. The system of claim 16, wherein:

the user-specified experiment configuration data comprises user-specified dial-up configuration data for an experiment, the dial-up configuration data indicating how to consistently split users between at least a first experience and a second experience, wherein the first experience is associated with the first ML model and the second experience is associated with a second ML model;

the selected experience comprises the first experience; and the selection of the experience is based on at least some of the dial-up configuration data.

19. The system of claim 16, wherein the transmitted request is sent to the private connectivity endpoint within a cloud private network, from a data plane component operating in the cloud private network, to a private connectivity endpoint that is also in the cloud private network, wherein the private connectivity endpoint provides connectivity to a second cloud private network without transiting the public internet, wherein the first ML model operates within the second cloud private network.

20. The system of claim 19, wherein to route the request the data plane is at least to process the request via the application layer load balancer using application-layer routing rules, including path-based routing rules, wherein the application layer load balancer operates within the second cloud private network.

* * * * *